United States Patent
Schumann

(10) Patent No.: US 9,984,149 B2
(45) Date of Patent: May 29, 2018

(54) MOTOR VEHICLE INFOTAINMENT SYSTEM WITH AUTOMATIC SEARCH TERM COMPLETION

(71) Applicant: AUDI AG, Ingolstadt (DE)

(72) Inventor: Toralf Schumann, Neuhaus (DE)

(73) Assignee: AUDI AG, Ingolstadt (DE)

( * ) Notice: Subject to any disclaimer, the term of this patent is extended or adjusted under 35 U.S.C. 154(b) by 282 days.

(21) Appl. No.: 14/769,686

(22) PCT Filed: Oct. 18, 2013

(86) PCT No.: PCT/EP2013/003141
§ 371 (c)(1),
(2) Date: Aug. 21, 2015

(87) PCT Pub. No.: WO2014/127791
PCT Pub. Date: Aug. 28, 2014

(65) Prior Publication Data
US 2016/0026644 A1    Jan. 28, 2016

(30) Foreign Application Priority Data

Feb. 22, 2013   (DE) .................. 10 2013 003 036

(51) Int. Cl.
*G06F 17/30* (2006.01)
*G01C 21/28* (2006.01)
(Continued)

(52) U.S. Cl.
CPC ......... *G06F 17/3064* (2013.01); *G01C 21/28* (2013.01); *G06F 3/0482* (2013.01);
(Continued)

(58) Field of Classification Search
None
See application file for complete search history.

(56) References Cited

U.S. PATENT DOCUMENTS 5,964,821 A * 10/1999 Brunts ............... G01C 21/3611
340/990
7,487,145 B1   2/2009 Gibbs et al.
(Continued)

FOREIGN PATENT DOCUMENTS

CN      101196900      6/2008
CN      101312523      11/2008
(Continued)

OTHER PUBLICATIONS

Google Inc.: Über Google Instant. Internet Hilfe Seite vom Aug. 29, 2012, http://web.archive.org/web/20120829111454/http://www.google.de/instant/.

(Continued)

*Primary Examiner* — Son T Hoang
(74) *Attorney, Agent, or Firm* — Henry M. Feiereisen LLC

(57) ABSTRACT

In a method for operating an infotainment system of a motor vehicle for searching in a database in which at least one database entry with a distinct object identifier and corresponding metadata is stored a search term is entered into an input field of an input unit. During entering of the search term an input completion unit searches through a search history for a search term that matches the partial input already present in the input field. The input unit then completes the partial input in the search field on the basis of the search term found in order to provide an input suggestion. When the search term is entered, additionally a searching unit searches in the database for at least one database entry which has an object identifier or metadata that at least partially matches the partial input and/or updated content in the input field and this database entry is displayed to the user in a selection list that is different from the input field for selection.

6 Claims, 1 Drawing Sheet

(51) Int. Cl.
*G06F 3/0482* (2013.01)
*G06F 3/0484* (2013.01)
*H04L 29/12* (2006.01)

(52) U.S. Cl.
CPC ...... *G06F 3/0484* (2013.01); *G06F 17/30091* (2013.01); *G06F 17/30259* (2013.01); *G06F 17/30672* (2013.01); *G06F 17/30696* (2013.01); *H04L 61/609* (2013.01)

(56) References Cited

U.S. PATENT DOCUMENTS

| | | | |
|---|---|---|---|
| 9,305,092 | B1* | 4/2016 | Finkelstein ......... G06F 17/3097 |
| 2006/0106769 | A1 | 5/2006 | Gibbs et al. |
| 2008/0294619 | A1 | 11/2008 | Hamilton, II et al. |
| 2010/0082604 | A1 | 4/2010 | Gutt et al. |
| 2011/0055762 | A1* | 3/2011 | Jung ..................... G06F 3/0481 715/835 |
| 2011/0131519 | A1* | 6/2011 | Ono ....................... B60K 35/00 715/771 |
| 2012/0124071 | A1 | 5/2012 | Gebhard et al. |
| 2012/0223845 | A1 | 9/2012 | Schumann |
| 2012/0254216 | A1* | 10/2012 | Aikawa ................ G06F 17/276 707/758 |
| 2013/0024461 | A1 | 1/2013 | Lee et al. |
| 2013/0325343 | A1* | 12/2013 | Blumenberg ......... G01C 21/00 701/533 |

FOREIGN PATENT DOCUMENTS

| | | |
|---|---|---|
| CN | 101395604 | 3/2009 |
| CN | 101641568 | 2/2010 |
| CN | 102880711 | 1/2013 |
| DE | 100 12 441 | 10/2001 |
| DE | 102 19 499 | 11/2003 |
| DE | 10 2006 002 739 | 8/2007 |
| DE | 10 2006 057 921 | 6/2008 |
| DE | 10 2008 041 256 | 2/2010 |
| DE | 10 2010 005 502 | 7/2011 |
| EP | 1 455 163 | 9/2004 |
| EP | 2 050 610 | 4/2009 |
| EP | 2 354 984 | 10/2011 |

OTHER PUBLICATIONS

Chinese Search Report dated Feb. 14, 2018 with respect to counterpart Chinese patent application 2013800758323.
Translation of Chinese Search Report dated Feb. 14, 2018 with respect to counterpart Chinese patent application 2013800758323.

* cited by examiner

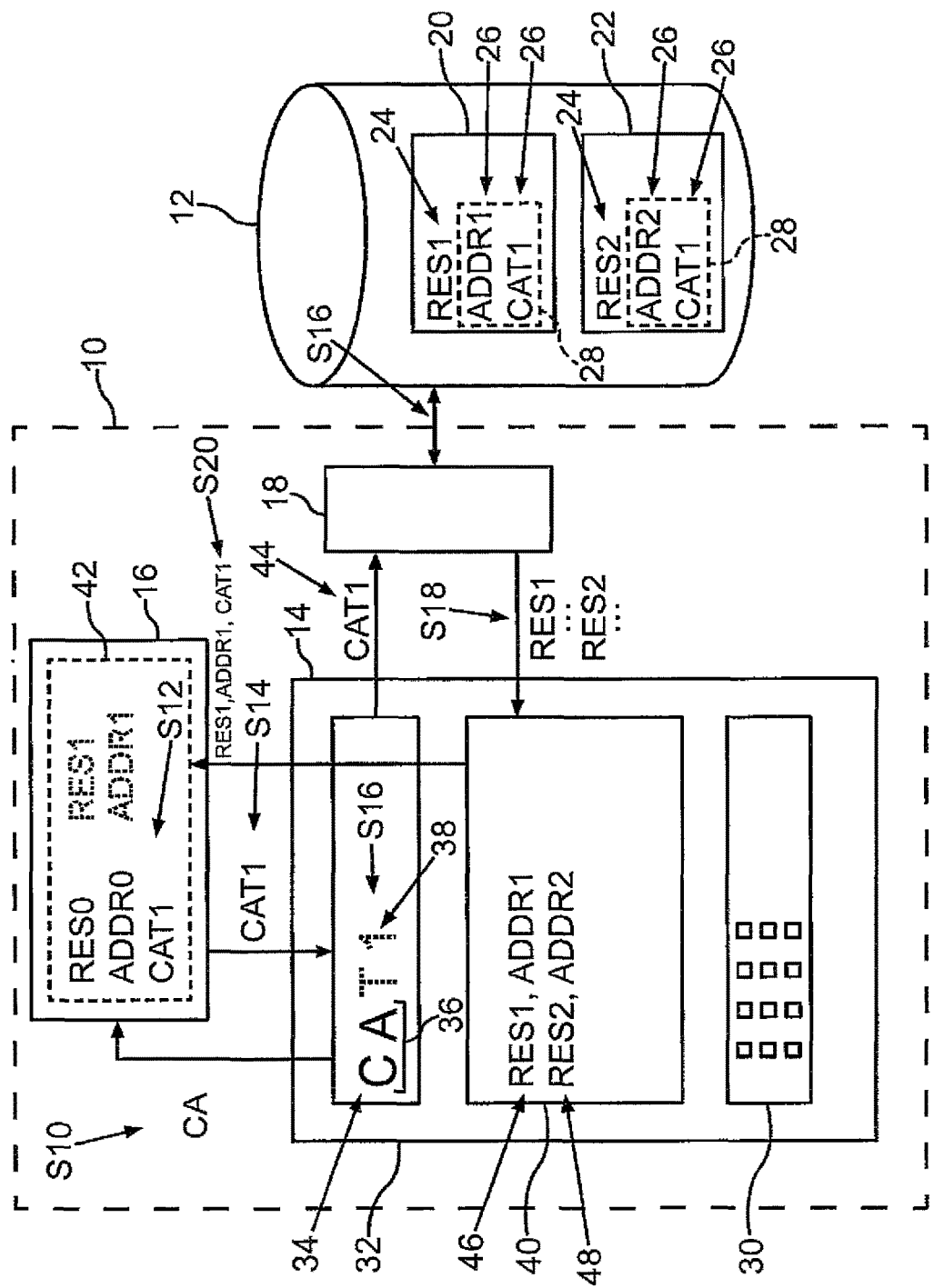

MOTOR VEHICLE INFOTAINMENT SYSTEM WITH AUTOMATIC SEARCH TERM COMPLETION

CROSS-REFERENCES TO RELATED APPLICATIONS

This application is the U.S. National Stage of International Application No. PCT/EP2013/003141, filed Oct. 18, 2013, which designated the United States and has been published as International Publication No. WO 2014/127791 and which claims the priority of German Patent Application, Serial No. 10 2013 003 036.6, filed Feb. 22, 2013, pursuant to 35 U.S.C. 119(a)-(d).

BACKGROUND OF THE INVENTION

The invention relates to a method for operating an infotainment system of a motor vehicle for searching a database. During entering of a search term into an input field an input unit automatically completes a partial input of the user to a suggested input. The invention also includes a motor vehicle with an infotainment system, which is operated according to the method.

An infotainment system of a motor vehicle, which can be operated in different operating modes, for example as navigation system, as telephony and as media playback can enable access to a large amount of data relating to each of these modes. In the navigation mode the user has to be provided access for example to a navigation database and has to be enabled to search the database. In the case of the telephony the user has to be able to search an address database. In the media playback the user has to be provided with access to titles of musical pieces and movies via a systematic search of a media database. For the search the user usually enters a letter or generally a character combination in an input field of an input device, which he extends stepwise or which he corrects by deleting erroneously entered characters. In the following this stepwise change of the partial input is referred to as editing or editing of a partial input.

In order to shorten the time of input of the search term and to thereby increase comfort during operation, it is known that when a user is searching for destinations, for example in a navigation system, to suggest a list of possible destinations to the user, that start with the already entered letter combination. The list can hereby contain already previously selected destinations.

The thus provided selection list does not fully realize all possibilities to guess the search result the user is looking for and to thereby enable the user to more quickly gain access to the searched for database entry.

From EP 1 455 163 A2 a method for entering destinations into a navigation system is known in which the destination objects are assigned to a class, in which similar destination objects are combined. From the destination database thus not only the destination objects are selected that are identical with the entered destination but also destination objects that are similar to the entered destination, so that typical writing errors such as letter inversions, typing errors, missing letters or a different spelling are compensated and the searched for destination objects can be displayed even though the destination was entered incorrectly.

From DE 102 19 499 A1 a method for selecting a name of a destination in a motor vehicle navigation system is known, in which characters are defined by entering the name of a destination character by character by the user and hereby selection suggestions for a name of a possible destination are displayed, wherein the selection suggestions contain a character sequence that has already been entered character by character as a starting component.

From DE 100 12 441 A1 a method for entering a destination in a navigation system is known in which characters of a destination name are entered and for which then a list of destination names is generated that start with the entered characters, wherein the list of destination names is generated depending on the distance of the destinations that are assigned to the name of the destination from the actual location.

From EP 2 050 610 A1 a motor vehicle is known in which a navigation system for entering a destination displays the most recently visited destinations on a right hand side of a screen, while the left hand side enables a character by character input of the name of the destination.

From the Fraunhofer institute a search program for mobile end devices is known which is marketed under the name "FlashFind". During entering of a search term a list of possible navigation destinations is displayed to the user, that the system has already found in a navigation database during the partial input. In addition the partial input inputted by the user is completed in the input field by different colored further search terms, which are selected from the list underneath the input field. The goal of this input method is to enable the system to output the desired database entry to the user as fast as possible without knowing beforehand what the destination searched for by the user is.

The navigation systems known from the state of the art thus offer either an intermediate search result from the navigation database or a list of the most recently visited destinations, as it can be retrieved from a search history of the navigation system.

From EP 2 354 984 A1 it is known that the full text search can be configured less complex when instead of using an individual full text index multiple index tables are used which are linked via a higher-level table. From this publication it is further known that an individual database entry of a database can also contain category data beside the actual, distinct object names for navigation destinations, which data for example indicate that a certain navigation destination is a restaurant.

SUMMARY OF THE INVENTION

The invention is based on the object to render searching a database in an infotainment system of a motor vehicle more efficient for a user.

The object is solved with a method for operating an infotainment system of a motor vehicle, including the steps of entering a search term in an input field of an input device; during the entering of the search term selecting with an input completion unit a matching search term from a search history, wherein the matching search term matches a partial input of the search term; completing with the input completion unit the partial input in the input field based on the selected matching search term, thereby generating an input suggestion; during the entering of the search term selecting with a search unit at least one database entry with a distinct object identifier from a database, wherein the database further contains metadata associated with the database entry, wherein the object identifier or the metadata at least partially match the partial input and/or an actual content of the input field; and displaying with the search unit the at least one database entry to the user in a selection list for selection by the user, wherein the selection list is different from the input field, and a motor vehicle having an infotainment system that is configured to implement the method according to the invention. Advantageous refinements of the invention are set forth in the dependent claims.

The method according to the invention makes it possible to perform a search in a data base with an infotainment system of a motor vehicle, i.e., for example a navigation database, an address database or a media database. The precondition for the method is that the database has at least one database entry in which on one hand a distinct name of an object is present, i.e., for example an address or a location, and on the other hand meta data relating to the object. The term metadata in the context of the present invention means data that classify the respective object, i.e., data that may have multiple database entries in common. In addition the metadata can be specific items of information regarding an object, which not necessarily serve for finding the database entry, for example opening times of a store or a musical genre of a musical piece stored in the mp3 file.

According to the method, during entry of a search term the user enters a search term into an input field of an input unit. The user enters the search term stepwise, i.e., he edits a partial input in the described manner. During this search term input the search unit locates at least one database entry whose object identifier or also whose media data at least partially match with the partial input or generally with the actual content of the input field. Then, the at least one located database entry is displayed to the user for selection in a selection list different from the input filed. The search can be performed again after each new input in the input field and correspondingly the selection list can be updated.

In addition according to the method it is provided that an entry completion unit also retrieves from a search history a historical search term which matches the partial input contained in the input field. Thus a second search in a search history takes place. The term search history is here to be understood as a search term memory in which search terms are stored that were formed from previous database searches. The search terms stored in the search history are hereby composed of data that are formed from database entries that were previously selected by the user, i.e., such database entries that the user has already verified in a previous search as desired database entries by his selection. Based on the search term retrieved from the search history the input unit then completes the partial input contained in the input field.

The invention has the advantage that now two data sources are offered to the user from completion of the search term input. In the selection list, database entries that come into question are displayed to the user directly from the database itself. In the input field the user thus receives an input suggestion from the search history. This increases the likelihood that when using the infotainment system the user only has to spend a short time editing the partial input before finding what he is looking for. The user is provided with the possibility to make a selection via the input field or the selection list. This can lead to a significant reduction of the input effort.

A particular aspect of the method is that also a comparison of the partial input or the actual content of the input field (i.e., the partial input plus an automatic completion form the search history) not only is searched the distinct object name itself in the data base, but also matching metadata. It may thus be the case that in the input field for example the term "Chinese restaurant" is written but then entirely different terms appear in the selection list, i.e., the names of matching Chinese restaurants, such as the name "lotus flower". This discrepancy between the content of the input field on one hand and the list entries in the selection list on the other hand is only possible in the method according to the invention.

When the user then selects a database entry displayed in the selection list, the search is successfully completed. In this case the search history then of course has to be updated, so that for the next search also information regarding the actual selection are contained therein. Hereby it has been proven particularly advantageous when after the selection not only the object name, i.e., the name of the navigation destination is stored as is known. Rather, an embodiment of the method provides that also the metadata from the selected database entry are stored in the search history. This has the particular advantage that also those search terms are entered into the search history that the user has never entered which, however, are nevertheless useful for future search processes.

This is explained in the following example. When the user is for example fond of Chinese food, it may be that in a first search the user for example enters the name of the Chinese restaurant known to him, for example "lotus flower". Once the user has selected the restaurant "lotus flower" as navigation destination from the selection list, the category description "Chinese restaurant" from the metadata of the database entry of the restaurant "lotus flower" is then also stored in the search history for further searches. When the user with his motor vehicle is located in another city and decides to go out to eat, he will then naturally not enter the name of the restaurant "lotus flower" known to him into the input field. The user knows that the restaurant "lotus flower" is located in a different city. Rather it is likely that the user, following his culinary preference, enters the term "Chinese restaurant". When the user has entered the partial input "Chin" it is now possible to selected the search term "Chinese restaurant" from the search history and to offer it to the user in the input field as input suggestion even though the user has never inputted this search term before.

As mentioned above, the method according to the invention can be used universally. An embodiment provides that the database includes a navigation database, in which as data entries respectively at least a name of the location as the distinct object identifier and as metadata the data that describe the location are stored. In particular the metadata can be a category to which the location is assigned. For example the data may state that the location is a restaurant, an airport or another location at which certain products or services can be obtained.

Another embodiment provides that the database includes a media database in which as data entries respectively a title is stored as the distinct object identifier and the metadata include information that describes the work of art that is designated by the title in more detail. For example the metadata can provide information regarding the music or movie genre of a musical piece or movie described by the title.

Another embodiment provides that the database includes an address database, in which as database entries respectively a name of a person or and institution is stored as the distinct object identifier and as metadata correspondingly information that describes the person or institution, i.e., for example the address or again also a category (private contact, business contact) is stored.

Of course the method can also provide to perform a search in a database which consists of two or multiple different databases, such as a navigation database, an address database and a media database. For this an advantageous refinement of the method provides that in the database or in the search history a context-dependent search is performed in dependence on an operating mode of the infotainment system. In other words the search is then not performed in all database components but only in those that match the actual operating mode. When the infotainment system is thus for example operated in the navigation mode, a search is only performed in the search history and/or in the database for those search terms or database entries that have something to do with navigation.

In order to advantageously offer to the user the actually searched for database entry after even fewer operating steps, an embodiment of the method provides to search the search history and/or the database in dependence on the actual geo-position of the motor vehicle. In particular in connection with the search history, which is also supplied with metadata, a meaningful search term can be found for the user in spite of the great amount of data. An equally advantageous refinement of the invention provides to make the search of the search history and/or the database dependent on a predetermined target region which the user can define beforehand. A comparable advantage results when the search is performed in dependence on a predetermined prioritization, i.e., only certain prioritized data are selected as search terms in the search history or as database entries in the database and offered to the user. For example only the largest cities or entries that are most popular according to a user rating may be searched.

The search is preferably performed phoneme-based, i.e., the user advantageously does not have to know the exact spelling of a search term. In particular in connection with a search history in which metadata are stored, i.e., search terms which the user has never himself entered before, such a query for search terms which phonetically match the partial input of the user is particularly robust for finding a search term desired by the user.

The previous embodiments of the method provide that a matching search term is selected in the search history and is completed in the input field as suggested input. A refinement of the method provides to select multiple matching search terms and in addition to the selection list to also generate a suggestion list with at least one further input suggestion. The user is thus offered to make a selection between multiple suggested inputs, no longer only in connection with the database entries themselves but also in connection with the search terms from the search history.

As described above, the invention also includes a motor vehicle. The motor vehicle according to the invention has an infotainment system which is configured to implement an embodiment of the method according to the invention.

BRIEF DESCRIPTION OF THE DRAWING

Other features and advantages of the present invention will be more readily apparent upon reading the following description of currently preferred exemplified embodiments of the invention with reference to the accompanying drawing, in which the sole FIGURE schematically shows an infotainment system and a database according to the invention.

DETAILED DESCRIPTION OF PREFERRED EMBODIMENTS

In the following the invention is explained once again by way of a concrete exemplary embodiment. For this the sole FIGURE schematically shows an infotainment system 10 and a database 12. The infotainment system 10 can be installed in a motor vehicle, for example a passenger car. The database 12 can also be situated in the motor vehicle or in a device outside the motor vehicle, for example a server device of the internet. The FIGURE shows an input device 14, an input completion device 16 and a search device 18 of the infotainment system 10. The input device 14, the input completion device 16 and the search device 18 can be hardware components or software modules of the infotainment system 10 or a combination thereof.

The infotainment system 10 enables a (not shown) user, to search the database 12 for database entries 20, 22 of which in the FIGURE only two are exemplary shown. Each database entry includes a distinct object identifier 24 and one or multiple further data elements 26. The further data elements 26 are metadata 28 of the respective database entries 20, 22. The database 12 can for example be a navigation database, an address database, or a media database or also a database which is a combination of the mentioned databases. For the example it is assumed that the database 12 is a navigation database and the database entries 20, 22 respectively describe certain locations. It is further assumed that the object identifiers 24 are names of restaurants (RES1, RES2). The further database elements 26 can for example consist of an address (ADDR1, ADDR2) of the respective restaurant as well as a category information (CAT1). It can also be provided that the metadata 28 only include the category information. In the present example the two database entries 20, 22 respectively describe a restaurant, which belongs to the same category CAT1. For example the category CAT1 can stand for the category "Chinese restaurant".

In the example the user uses the infotainment system 10 to be directed to a restaurant. In order to define a navigation destination, the user activates a navigation mode of the infotainment system 10. Via an operating device 30, for example a touchpad or a keyboard displayed on a touch screen, the user starts to enter a letter string 34 in an input field 32 of the input device 14, for which letter string 34 a search is to be performed in the database 12 by the search unit 18. The FIGURE shows how the user during this editing of the letter string 34 has entered a first partial input 36, here the letter sequence CA.

The user has already beforehand, for example several days or weeks ago, entered the name of a restaurant RES0 into the input device 14 in order to be guided to this restaurant by the navigation system 10. The restaurant RES0 was a Chinese restaurant and the user seeks to visit a Chinese restaurant again. Because the user does not know any other restaurant from this category he would like to enter the category description, here CAT1 into the input field 32. He has never previously entered this category description into the input field 32. Nevertheless the infotainment system is capable based on the partial input 36 entered by the user to determine an input suggestion 38 by means of the input completion device 16 and to display this suggestion in the input field 32, which result in the complete and accurate category description CAT1. In addition in a selection list 40, the infotainment system 10 can already display a list of the matching restaurants from this category to the user, even though the user has only entered the letter sequence "CA".

For this, the infotainment system performs the following steps. The partial input 36 is transmitted in a step S10 to the input completion device 16. The input completion device 16 has a search term memory, which represents a search history 42. In the search history 42 the object identifiers 24 as well as the metadata 28 are stored from previous searches in the database 12 of such search results, that where confirmed by the user as the desired search result. Because the user has already searched for the restaurant RES0, this name RES0 and also the address ADDR0 of the restaurant RES0 as well as the category CAT1 of the restaurant RES0 are stored.

The input completion unit 16 selects in a step S12 a search term in the search history 42, which search term has a component which matches the partial input 36. In this case this is the category description CAT1. In a step S14 the selected search term (CAT1) is transmitted to the input unit 14, which completes the partial input 36 to resulting in the input suggestion 38 in a step S16. This change in the input filed 32 also triggers a search process in the search unit 18 in which the search unit 18 performs a database search in the database 12 based on the actual content 44 of the input field 32, i.e., now "CAT1". Hereby the object identifiers 24 as well as the metadata 28 of the database entries 20, 22 of the database 12 are checked for a match with the actual content 44. In the shown example the search unit 18 finds the database entries 20 and 22 because the same category CAT1 is contained in the metadata 28. The search of the database can hereby be conducted in a manner known per se.

The search unit 18 provides in a step S18 the found database entries 20, 22 of the input unit 14. From the object identifiers 24 and the address entries of the found database entries 20, 22 the input unit 14 generates the selection list 40, from which the user can select a list entry 46, 48 by means of the operating device 30, when the searched for navigation destination is contained in the selection list 40. For the example it is assumed that the user selects the list entry 46, i.e., the database entry 20 of the restaurant RES1. The latter can then be determined as navigation destination in the infotainment system 10 in a not further illustrated step, and the navigation can be started.

For the selected database entry 20 the input device 14 transmits in a step S20 the object identifier 24 and the metadata 28 to the input completion device 16. The input completion device 16 stores the object identifier 24 and the metadata 28 of the database entry 20 selected by the user in the search history 42. Because the category description CAT1 is already present in the search history 42 the latter is of course not doubly stored.

As a result of this method the user using the infotainment system 10 is provided during the input with a selection list of matching search results and also in the input field an input suggestion based on matching individual words from the search history. When the navigation mode is activated, the input suggestion is based in particular on street names and so-called points of interest, i.e., names of locations of a particular interest. For the input suggestion in particular also metadata from already selected destinations are taken into account from the search history (selection history). From search results that have bee selected previously, i.e., not only searched search results, all metadata that exist regarding this search result, are included in a global or also context-specific (navigation, telephony, media) search history and are suggested in subsequent search inputs, when the already entered letter combination at least partially matches with entries in the metadata.

Search results in the search history and the database are in particular destinations of a navigation system, i.e., city names, street names, names of points of interest, brand and business names (for example names of restaurant chains), types of locations (airport, restaurant) and lifestyle (for example vegetarian food).

Preferably the display of the hits depends on the actual geo-position of the motor vehicle or on the region in which the motor vehicle is located (for example EU or North America). Also a context-specific search can be performed or the search can be limited to the largest cities or limited by means of another prioritization.

In the hit list the part of the list entry that matches with the searched for letter string is in particular marked with color. As mentioned, it is in particular advantageous when a search is phoneme-based, in order to take different spellings into account.

As an alternative or in addition, the search can also be performed in musical data with performers, genre, song, station lists (station) or also in telephone lists (calls, address books, favorites).

The invention enables a user to make a selection via the input field as wells as via the selection list, which are respectively fed by different data sources. This can result in a significant reduction of the input effort.

What is claimed is:

1. A method, implemented at least by a computing device, for operating an infotainment system integrated within a motor vehicle, comprising:
    entering, by a user, a search term in an input field of an input device;
    selecting, by an input completion unit and during the entering of the search term, a matching search term from a search history, wherein the matching search term matching a partial input of the entered search term;
    completing, by the input completion unit, the partial input in the input field based on the selected matching search term, thereby generating an input suggestion;
    selecting, by a search unit during the entering of the search term and based on the input suggestion, at least one database entry with a distinct object identifier from a database, wherein
        the database comprises a navigation database storing database entries such that each entry includes a name of a location as object identifier and metadata that describe the location, a media database storing data entries such that each entry includes a title as object identifier and metadata which describe a work of art having the title, and an address database storing data entries such that each entry includes a name as object identifier and metadata that describe a person or an institution identified by the name,
        the object identifier or the metadata at least partially matching the input suggestion,
        the input device, the input completion unit, and the search unit being each a component of the infotainment system,
        the matching search term or the selected at least one database entry is selected in dependence on an actual geographical location of the motor vehicle,
        the matching search term being never entered or used by the user in the search history and comprising at least one category derived from the metadata of the selected at least one database entry, and
        the matching search term and the selected at least one database entry are searched in dependence on an operating mode of the infotainment system, wherein only the navigation database is searched when the operating mode is navigation mode, only the media database is searched when the operating mode is media mode, and only the address database is searched when the operating mode is telephony mode; and
    displaying, by the search unit, the selected at least one database entry to the user in a selection list for selection by the user so that a discrepancy results between the input suggestion of the input field and the selected at least one data base entry displayed in the selection list, the selection list being different from the input field.

2. The method of claim 1, further comprising after the selection of the selected at least one database entry displayed in the selection list, storing the metadata associated with the selected at least one database entry in a search history of the search unit.

3. The method of claim 1, wherein in the search history, the matching search term and the at least one database entry are further selected in dependence on at least one of an actual geo-position of the motor vehicle, a predetermined target region and a predetermined prioritization.

4. The method of claim 1, wherein the matching search term and the selected at least one database entry include a part which phonetically matches the partial input.

5. The method of claim 1, further comprising generating a list from multiple matching search terms from the search history, the list containing at least one further input suggestion.

6. A motor vehicle comprising an infotainment system integrated therein, the infotainment system comprising:
- a processor, implemented at least partially by hardware;
- an input device, executed by the processor, having an input field for entering a search term by a user;
- an input completion unit, executed by the processor, that selects a matching search term from a search history during the entering of the search term, wherein the selected matching search term matching a partial input of the search term, and the input completion unit completing the partial input in the input field based on the selected matching search term, thereby generating an input suggestion;
- a search unit, executed by the processor, that selects at least one database entry with a distinct object identifier from a database during the entering of the search term and based on the input suggestion, wherein
- the database including a navigation database storing database entries such that each entry includes a name of a location as object identifier and metadata that describe the location, a media database storing data entries such that each entry includes a title as object identifier and metadata which describe a work of art having the title, and an address database storing data entries such that each entry includes a name as object identifier and metadata that describe a person or an institution identified by the name,
- the object identifier or the metadata at least partially matching the input suggestion,
- the input completion unit or the search unit respectively selects the matching search term or the selected at least one database entry in dependence on an actual geographical location of the motor vehicle,
- the matching search term being never entered or used by the user in the search history and comprising at least one category derived from the metadata of the selected at least one database entry, and
- the matching search term and the selected at least one database entry are searched in dependence on an operating mode of the infotainment system, wherein only the navigation database is searched when the operating mode is navigation mode, only the media database is searched when the operating mode is media mode, and only the address database is searched when the operating mode is telephony mode; and
the search unit displaying the selected at least one database entry to the user in a selection list for selection by the user so that a discrepancy results between the input suggestion of the input field and the selected at least one data base entry displayed in the selection list, the selection list being different from the input field.

* * * * *